United States Patent

[11] 3,603,449

[72] Inventors: Frederick O. Snow, III
 Wayne;
 Francis X. Connelly, Rutherford, N.J.;
 Harold Glazer, Ocean Springs, Miss.;
 Nandor K. Latincsics, Wanague, N.J.
[21] Appl. No. 866,792
[22] Filed Oct. 6, 1969
[45] Patented Sept. 7, 1971
[73] Assignee Hewitt-Robins Incorporated

[54] TRANSITION STRUCTURE BETWEEN CONVEYOR AND ROTARY ELEVATOR WHEEL
 12 Claims, 19 Drawing Figs.

[52] U.S. Cl. .................................................. 198/167,
 198/85, 198/192
[51] Int. Cl. ........................................................ B65g 29/00
[50] Field of Search .......................................... 198/167,
 211, 162, 85, 230, 192

[56] References Cited
 UNITED STATES PATENTS
 587,509 8/1897 Roberts .......................... 198/85 X
 1,596,840 9/1926 Kopf .............................. 198/85
 3,470,999 10/1969 Snow ............................. 198/167 X

Primary Examiner—Gerald M. Forlenza
Assistant Examiner—Jerold M. Forsberg
Attorney—John D. Boos ABSTRACT: The present invention employs a rotatably mounted wheel in combination with a belt conveyor for elevating material conveyed by the conveyor. The wheel has a plurality of storage cells formed around the periphery of the wheel. The conveyor belt wraps around the peripheral section of the wheel trapping the material on the belt in the storage cells and thereby permitting the conveyed material to be elevated to a discharge location. The material is trapped in the compartments by a back plate or seal belt which is maintained in contact with a portion of the inner surface of the wheel. The conveyor belt is maintained in a troughlike condition during the loading and transporting of the bulk materials conveyed thereby and the side portions thereof are elevated so as to centrally locate the bulk materials thereon prior to contacting the rotatably mounted wheel at which point the conveyor belt is flattened. Stationary and pivotally mounted skirt boards are positioned above and adjacent to the load supporting surface of the conveyor belt so as to guide the bulk materials into the storage cells of the wheel. One modification of the present invention includes the provision of biasing members for resiliently mounting that portion of the conveyor belt subjacent the base of the rotatably mounted wheel so as to assure a sealing contact between the belt and wheel and to compensate for any irregularities in the roundness of the wheel. A second modification of the present invention includes the provision of a pair of return conveyors positioned adjacent the side portions of the conveyor belt along the base of the elevating wheel so as to return all materials inadvertently escaping from the belt to a position on the belt prior to the centering of the bulk material conveyed thereby. One further modification of the present invention includes the provision of removal means for removing material from the outer edges of the conveyor belt and for depositing such material into the return conveyors.

INVENTORS
FREDERICK O. SNOW, III
FRANCIS X. CONNELLY
HAROLD GLAZER
NANDOR K. LATINCSICS
BY John D. Boos
ATTORNEY

INVENTORS
FREDERICK O. SNOW, III
FRANCIS X. CONNELLY
HAROLD GLAZER
NANDOR K. LATINCSICS

BY John D. Boos ATTORNEY

TRANSITION STRUCTURE BETWEEN CONVEYOR AND ROTARY ELEVATOR WHEEL

BACKGROUND OF THE INVENTION

Conventional endless belt conveyors can generally convey bulk materials up maximum inclines in the order of 15° to 20°. If the angle of inclination for this type of conveyor is increased above this upper limit, the free flowing character of some bulk materials will cause the material on the inclined portion of the conveyor to slide down toward the bottom of the incline. The shifting bulk material will cause spillage problems and decrease the conveying capacity of the conveyor.

Another problem with conventional belt conveyors is that a relative long horizontal distance is required if the conveyor is to elevate the conveyed material to a relatively large vertical distance. One reason for this is, as previously stated, because the conveyor can only be inclined at a maximum angle of 15° or 20°. A second reason is because the transition from the horizontal portion of a conveyor to the inclined portion must be very gradual in order to prevent the conveyor belt from lifting off the idlers. Thus, this transition portion of the conveyor must be designed so as to allow the conveyor belt to move through an upward vertical curve having a very large radius if the conveyor belt is to be properly supported in this location.

It will therefore be apparent that a conventional belt conveyor would be unsuitable in those situations where, because of space limitations, the conveyed material must be elevated a relatively large distance vertically within a relatively short horizontal distance.

One prior art solution to these problems suggested the use of a second belt arranged to travel in face-to-face relationship with the inclined section of the conveyor belt so that the conveyed material is held between the two belts as the material is elevated or conveyed up the incline. This type of system necessitates two independent belt systems with a mechanical or electrical system to synchronize the speed of the entire system. In addition, the belts for this type of system are generally not conventional and must be specially designed and constructed.

Other prior art solutions have employed additional pieces of material handling equipment, such as bucket elevators to lift the conveyed material. This type of solution is not completely satisfactory since bucket elevators travel relatively slowly so that extremely large buckets are required if it is to convey the same capacity as the conveyor. In addition, a bucket elevator is a separate piece of equipment having an independent drive and control system which must also be synchronized with the conveyor.

One solution to the above-mentioned problem is U.S. Pat. No. 3,470,999, issued Oct. 7, 1969 to the same assignee, wherein there is disclosed a conventional conveyor belt coming into contact with and wrapping around a section of a rotatably mounted wheel. The wheel is formed with a plurality of peripheral storage cells that form storage compartments for the conveyed material on the belt. The conveyed material is trapped in the compartments between the belt on the outside and a back plate or seal belt on the inside and is carried upward to an overhead discharge location. In the transferring of material from the conveyor belt into the storage compartments of the wheel undesirable spillage may occur. It is therefore highly desirable to have a transition section which will efficiently transfer material from the belt into the wheel at extremely high speeds without creating excessive spillage.

SUMMARY OF THE INVENTION

The present invention overcomes many of the disadvantages of the prior art by having a conventional conveyor belt come in contact with and wrap around a section of a rotatably mounted wheel. The wheel is formed with a plurality of peripheral storage cells that form storage compartments for the conveyed material on the belt. The conveyed material is trapped in the compartments between the belt on the outside and a back plate or seal belt on the inside and is carried upward to an overhead discharge location. Prior to coming into engagement with the rotatably mounted wheel, the sides of the conveyor belt are elevated so as to centrally locate the bulk materials thereon. Fixed and pivotally mounted skirt boards rest upon the load supporting surface of the conveyor belt to maintain the bulk materials in a central location atop the belt and to guide the materials in a gentle transition to the storage compartments. That portion of the conveyor belt adjacent the base of the rotatably mounted wheel can be biased toward the wheel in a resilient manner so as to assure a sealing contact between the belt and wheel and to compensate for any irregularities in the roundness of the wheel. A pair of return conveyors can be provided adjacent the base side portions of the elevating wheel so as to catch any materials due to spillage and to return such materials to the conveyor belt prior to the centering portion thereof.

Accordingly, one object of the present invention is to provide elevating means for use in combination with a belt conveyor for elevating conveyed material while minimizing the possibility of spillage.

Another object of the invention is to provide an elevating wheel in combination with a belt conveyor whereby conveyed material on the belt conveyor can be elevated a relatively large height within a relatively short distance.

A further object of the invention is to provide an elevating wheel having a plurality of storage compartments about the periphery thereof in combination with a belt conveyor and means for minimizing the possibility of spillage while transferring conveyed material on the belt conveyor into the storage compartments to be elevated a relatively large height within a relatively short distance.

A still further object of the invention is to provide an elevating wheel in combination with a belt conveyor wherein the conveyed material on the belt conveyor is readily centrally located and guided into the storage compartments of the elevating wheel while minimizing the possibility of spillage.

One further object of the invention is to provide an elevating wheel in combination with a belt conveyor and means for catching material escaping from the belt conveyor and returning such material to the belt conveyor.

DESCRIPTION OF THE DRAWINGS

Other objects, advantages and novel features of the present invention will become apparent from the following detailed description of the invention when considered in conjunction with the drawings wherein.

DESCRIPTION OF THE PREFERRED EMBODIMENT

Figure 1:
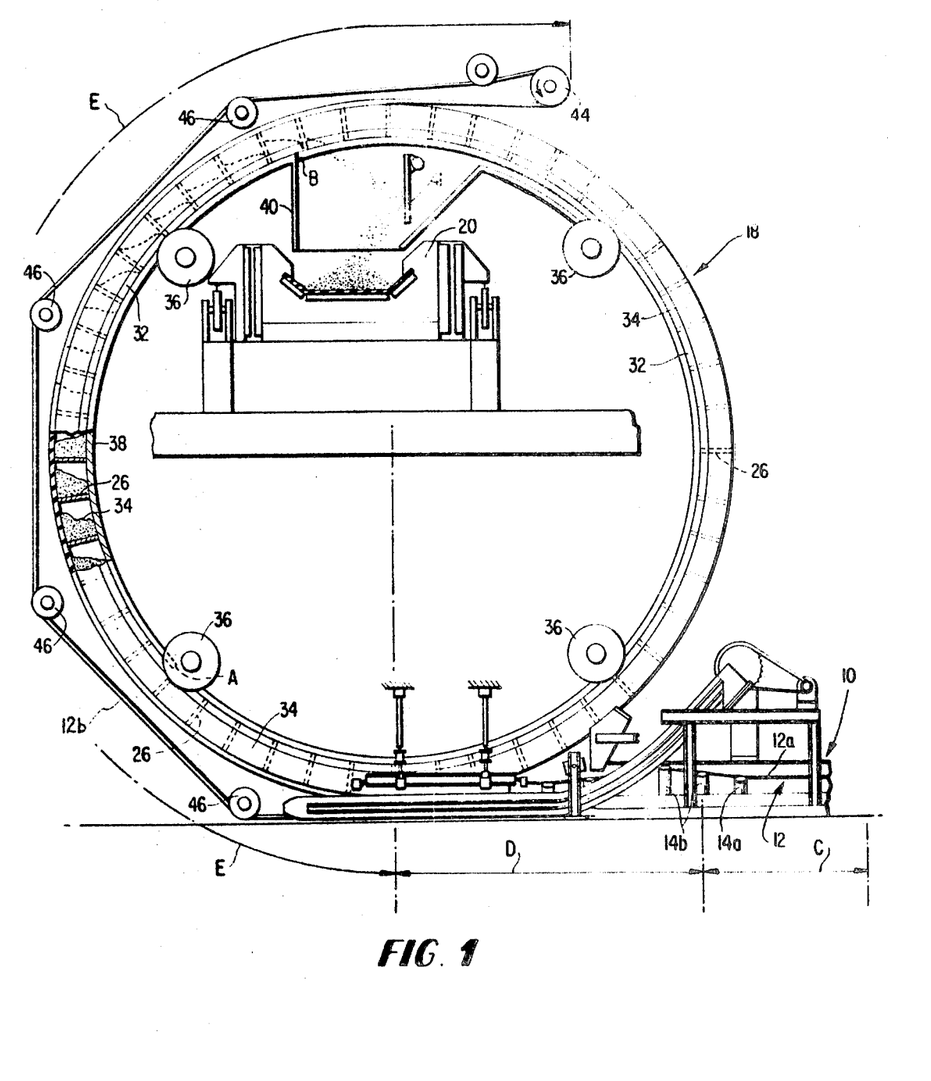
FIG. 1 is a side view of the head end of a belt conveyor employing the elevating wheel of the present invention with parts broken away.

Referring now to the drawings, wherein like reference characters designate identical or corresponding parts throughout the several views, and more particularly, to FIG. 1 thereof, wherein a conventional conveyor 10 is shown with the conveyor belt 12 having a conveying reach 12a supported by troughing idler roll assemblies 14a, 14b, 14c and a return reach 12b supported by straight return idlers 16. At the head end of the conveyor, an elevating wheel 18 cooperates with the conveyor belt, as will hereinafter be described, to raise the conveyed material to a second conveyor 20.

The elevating wheel 18 is formed with spaced, substantially parallel, annular rim structures, not shown, coupled together by equally spaced, radial partition members 26. Each rim structure is composed of an annular support member having a channel-shaped cross section, a flat annular side plate coupled to the support member and guide rail 32 coupled to the inside of the annular support member. The guide rails 32 of each of the rim structures are in planes which are substantially parallel to each other and combine to form a substantially circular, closed loop track system. The side plates of the rim structures combine with partitions 26 to form a plurality of substantially rectangular storage cells 34 located around the periphery of the elevating wheel. The storage cells have exterior loading openings which open radially outwardly around the periphery of the elevating wheel and interior unloading openings which open radially inwardly toward the center of the elevating wheel.

The elevating wheel is rotatably supported by a plurality of rotatably mounted support wheels 36 that fit on the guide rails 32. In the embodiment disclosed, four wheels are employed with each of the guide rails, and are positioned as shown in FIG. 1. Each wheel is rotatably supported from a conventional support structure, not shown, and is provided with suitable bearing means to insure easy rotation.

An arcuate backing plate 38 covers the interior opening of the cells 34 between points A and B as indicated in FIG. 1. The backing plate is substantially channel-shaped in cross section, and the sides of the channel extend upwardly around the inner edge of the side plates. In this manner, material in the storage cells between points A and B is prevented from being discharged through the inside openings of the storage cells. At point B, the backing plate terminates in order to permit material in the cells to be discharged into chute 40 formed over the second conveyor 20. A pivotally suspended baffle 41 may be mounted in the chute for directing the conveyed material into conveyor 20. A seal belt can be utilized in place of backing plate 38 for preventing material in the storage cells from being discharged through the inside openings of the storage cells between points A and B. Such a seal belt arrangement is disclosed in U.S. Pat. No. 1,776,420, issued Sept. 23, 1930, to Eichenberger for sealing the inner pocketed circumference of an elevator wheel.

The elevating section of the conveying reach wraps around a peripheral section of the elevating wheel such that the loading openings of the wheel are closed by the elevating section of the belt. In the embodiment disclosed, the elevating section is shown wrapped around approximately one-half of the circumference of the wheel; however, it is only necessary that the elevating section remain in contact with the wheel until all of the conveyed material has been transferred from the conveying region into the storage cells, as will hereinafter be described. Sufficient frictional contact is made between the belt and the elevating wheel so that the belt will provide drive means for the periphery of the elevating wheel at substantially the same speed and in the same direction as the conveying reach. The drive means for the wheel could alternatively be a special powered mechanical drive which will drive the periphery of the wheel at the same speed as the belt conveyor. After the belt has been extended around the elevating wheel, it is reeved about head drive pulley 44 and is guided back down to the straight conveyor section by rolls 46. The belt then travels over the straight idler rollers 16 to the tail pulley, not shown.

Figure 2:
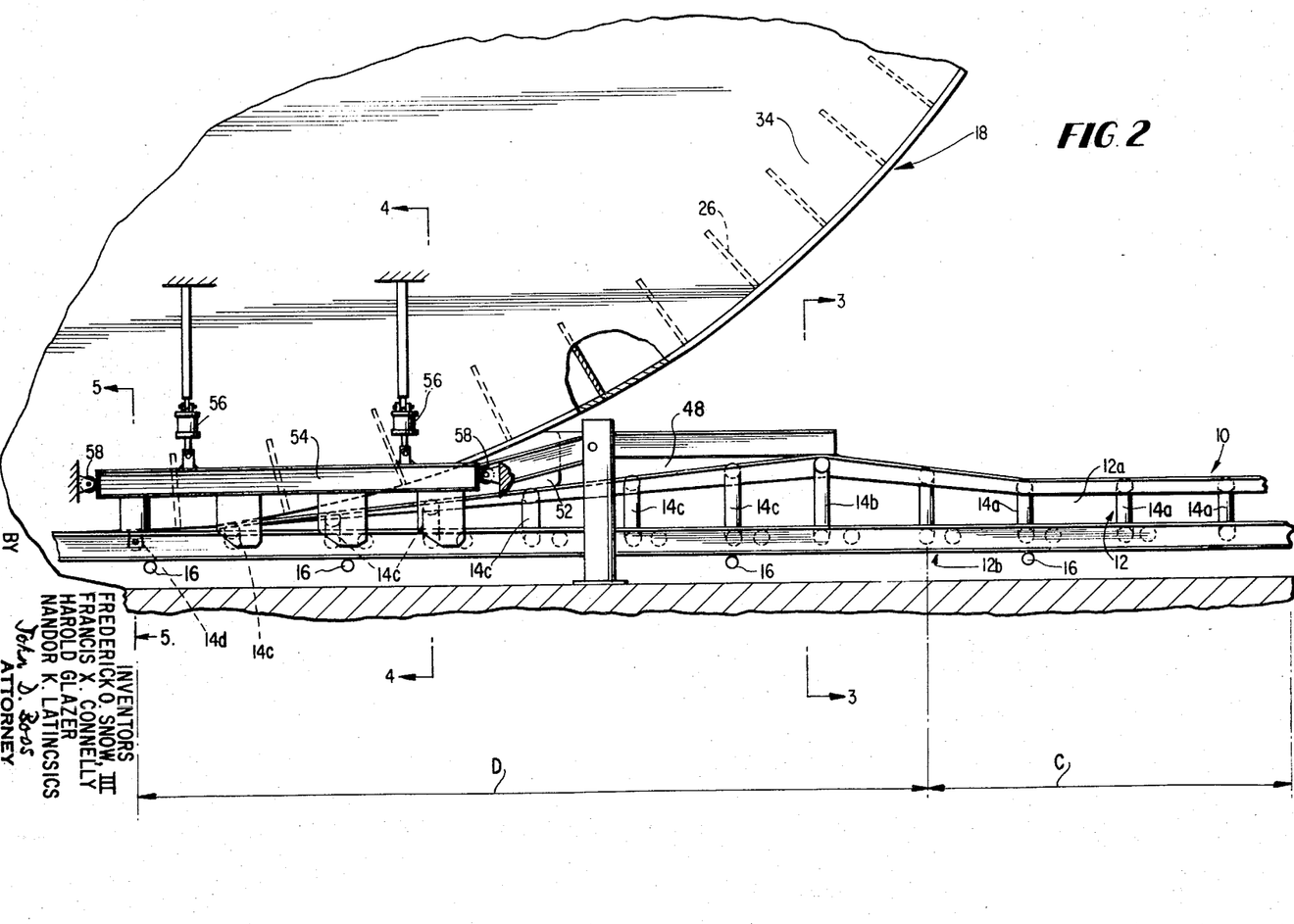
FIG. 2 is a partial exploded view of the base portion of the elevating wheel and associated conveying equipment with parts broken away.

Referring now to FIGS. 1 and 2, wherein there is illustrated the overall system for transporting the bulk materials, it is seen that the conveying reach 12a is basically divided into a conveying section C, an elevating section E wrapped around elevating wheel 18, and a transition section D intermediate the conveying and elevating sections. As the conveying reach 12a proceeds through the conveying and transition sections, C and D respectively, the belt is supported by troughing idlers indicated generally by the reference numeral 14 and specifically by the reference characters 14a, 14b, and 14c. The troughing idlers utilized for supporting the conveyor belt do not in themselves constitute a patentable feature of the present invention and any conventional idlers capable of supporting a conveyor belt in a troughlike configuration can be utilized in the system of the present invention. As will be better understood from the following description of the transition section of the present invention, the only limitation on the choice of troughing idlers which can be utilized is that the idlers must have the capability of being mounted such that the side portions of any particular idler will be maintained at a desired angle of inclination such that the conveyor belt supported by the idlers will have a general configuration of a trough with the width and depth of the trough at any particular location along the conveying reach being determined by the angle of inclination of the side portions of the idler at that location.

Figure 3:
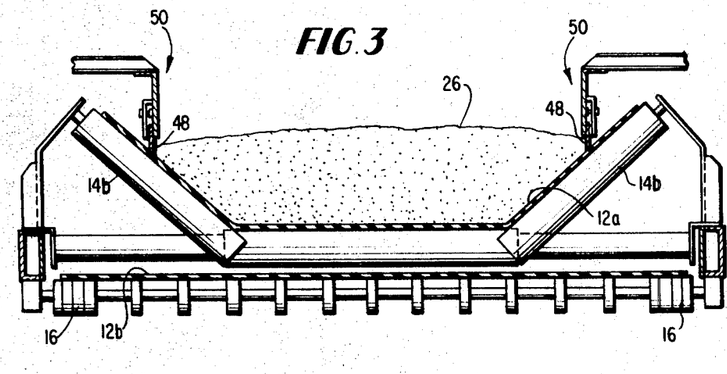
FIG. 3 is a view taken along line 3—3 of FIG. 2.
Figure 4:
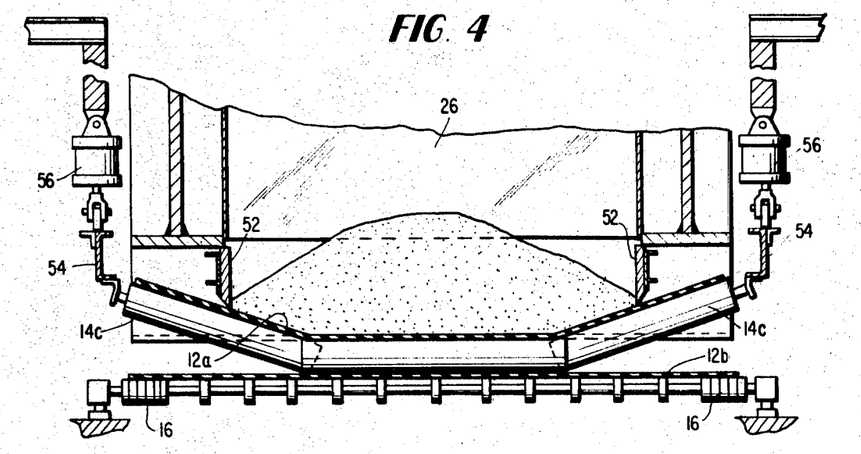
FIG. 4 is a view taken along line 4—4 of FIG. 2.

Referring now to FIGS. 2 through 5, wherein there is illustrated a novel and improved system for assuring that the bulk materials transported by conveying reach 12a are substantially completely enclosed within the storage cells 34. The transition section D consists basically of a first means, such as troughing idlers 14b, adjacent the conveying section C which supports the conveyor belt in a troughlike configuration with the longitudinal edges of the belt positioned at an elevation which is higher than the elevation at which the longitudinal edges are positioned throughout the conveying section so as to enable bulk materials carried by the conveyor belt to fall into the central portion of the belt due to the increased depth and decreased width of the troughlike configuration; second means, such as skirt boards 48 and 52 described more fully hereinafter, for maintaining and guiding the bulk material in the central portion of the belt; and third means, such as troughing idlers 14c for lowering the conveyor belt to a substantially flat condition prior to coming into engagement with the elevating wheel. As the conveying reach 12a leaves the conveying section C and enters the transition section D, the side portions thereof are brought into an elevated position by the troughing idlers 14b which are positioned at varying elevations having a maximum angle of inclination as shown in FIG. 3 and during a second phase of the transition section the side portions are lowered by troughing idlers 14c which are positioned at decreasing angles of inclination, as shown in FIG. 4. The temporary elevation of the sides of conveying reach 12a causes the bulk materials on the conveyor belt to centrally locate such that the materials will be positioned within the maximum width of storage cells 34 on the elevating wheel 18.

A pair of fixed flexible skirt boards 48 are held in engagement with the load supporting surface of conveyor reach 12a by conventional supporting structure as indicated generally by the reference numeral 50 so as to provide guide means for the bulk material. The fixed skirt boards 48 may either lie along the longitudinal axis of the conveyor or may be angularly disposed thereto so as to further assist in the centering of the bulk materials being conveyed. As the conveyor reach 12a proceeds from the position shown in FIG. 3 to the position shown in FIG. 4, the side idler rollers 14c decrease in elevation such that the conveying reach 12a begins to flatten out. When in the position shown in FIG. 4, the load supporting surface of conveying reach 12a comes into surface contact with a second pair of skirt boards 52 which are pivotally mounted in a manner more fully described hereinafter. The fixed skirt boards 48 and the pivotally mounted skirt boards 52 are in end-to-end longitudinal alignment so as to present a gradual transition zone for guiding the material toward the elevating wheel within the required width of the storage cells.

Figure 5:
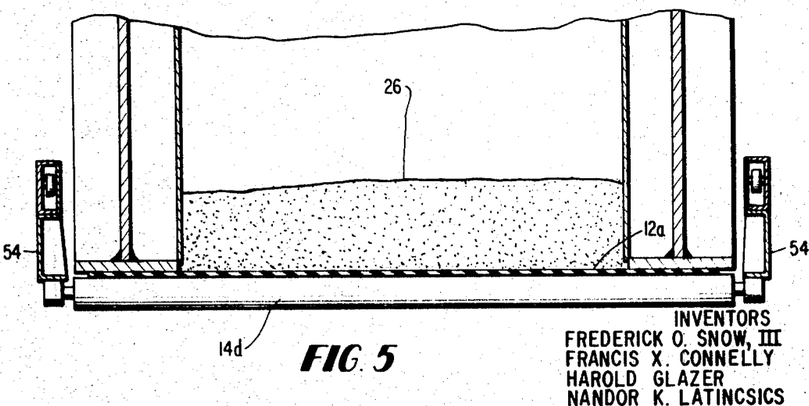
FIG. 5 is a view taken along line 5—5 of FIG. 2.

The conveyor assumes a flattened condition as a result of coming into engagement with the elevating wheel 18, as shown in FIG. 5. In this manner, all of the bulk material carried by the conveyor will be guided and transported into the storage cells 34 with as little spillage as possible. In the preferred embodiment of the present invention the conveyor belt is not supported by idler rollers adjacent the base portion of the wheel at or near the point at which the belt and wheel come into contact. In one contemplated embodiment, the last supporting idler roller is located approximately two feet behind the vertical center line of the elevating wheel. Thus, the belt is permitted to stretch outwardly a slight amount if there is any bulk material trapped between one of the vanes of the elevating wheel and the top surface of the belt.

Figures 6, 7:
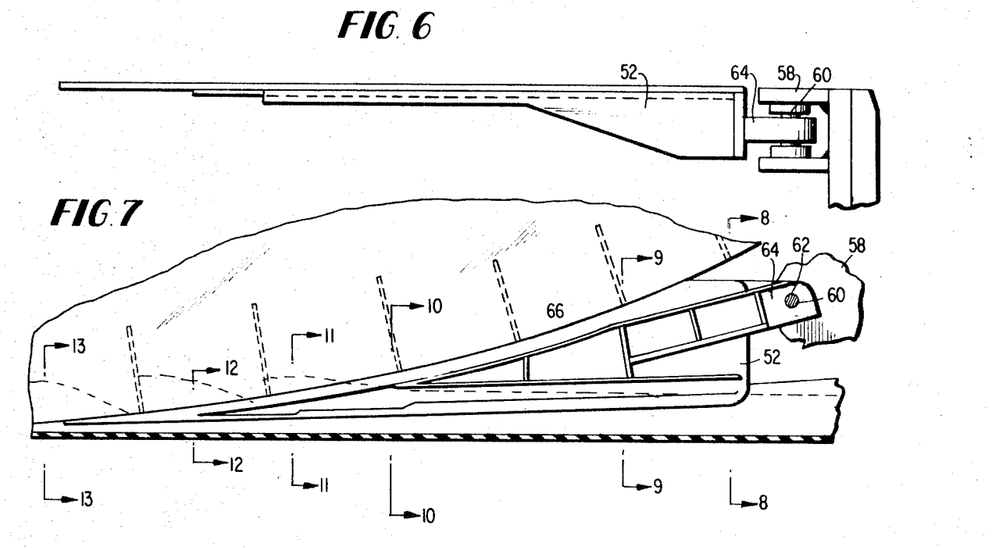
FIG. 6 is a top plan view of the pivotally mounted skirt board of the present invention.
FIG. 7 is a partial exploded view of the base portion of the elevating wheel illustrating the pivotally mounted skirt board of FIG. 6 in operation.
Figures 8, 13:
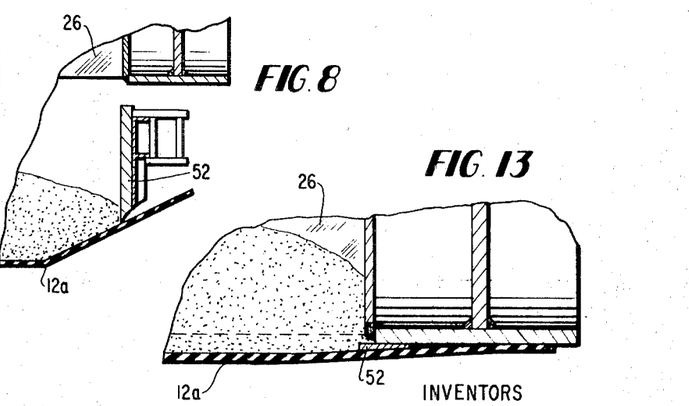
FIG. 8 is a view taken along 8—8 of FIG. 7.
FIG. 13 is an enlarged view taken along line 13—13 of FIG. 7.
Figure 9:
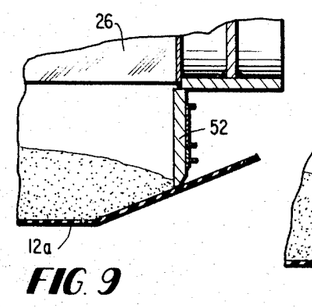
FIG. 9 is a view taken along 9—9 of FIG. 7.
Figure 10:
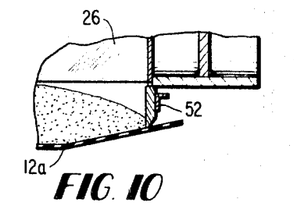
FIG. 10 is a view taken along line 10—10 of FIG. 7.
Figure 11:
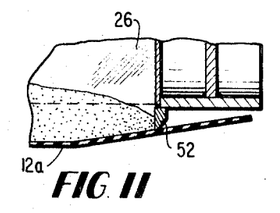
FIG. 11 is a view taken along line 11—11 of FIG. 7.
Figure 12:
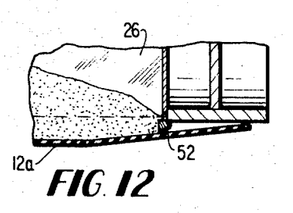
FIG. 12 is a view taken along line 12—12 of FIG. 7.

Skirt boards 52 associated with that portion of the belt adjacent the base portion of elevating wheel 18 are pivotally mounted as shown in FIGS. 6 and 7, such that the skirt boards will move with the belt and prevent the bulk materials thereon from escaping from the central portion thereof. The side boards 52 are pivotally mounted to support structure 58 by means of a pin 60 extending through an aperture 62 formed in a tonguelike extension 64 of the side boards. The upper edge portion 66 of the side boards 52 have a generally curvilinear shape so as to conform to the outer surface of the elevating wheel 18. As shown in FIGS. 8 through 13, respectively, the cross-sectional height of the side boards 52 decreases in a generally smooth and continuous manner as the conveying reach 12a flattens out and approaches the elevating wheel 18 and the associated partition members 26.

To further assure that the material being transported by conveying reach 12a will enter the storage cells 34 through a relatively smooth transition and with as little spillage as possible, a first modification of the present invention provides for resiliently mounting that portion of the conveying reach within close proximity to the elevating wheel 18, to compensate for any manufacturing irregularities in the outer diameter of the elevating wheel and to also act as a safety device in the event bulk material is trapped between the elevating wheel and the belt. The resilient mounting of the belt adjacent the base of the wheel assures a good seal between the belt and wheel despite any variance in the roundness of the periphery of the wheel. As shown most clearly in FIGS. 2, 4 and 5, the idler rollers 14c and 14d adjacent the base portion of the elevating wheel 18 are each rotatably mounted on a pair of side supporting members 54 which are, in turn, secured to conventional supporting framework by biasing means such, for example, as hydraulic or pneumatic biasing members 56, which gently urge the idler rollers and the associated belt portion toward the base of the elevating wheel. Guide rollers 58 at the end and outer side portions of member 54 position the bank of idlers vertically and guide them. Any material which becomes lodged between the free outer edge of partition members 26 and the supporting surface of the belt will be gently dislodged such that the belt will completely cover the outer portion of the storage cells 34 during transportation of the bulk materials within the cells 34 from point A to point B.

Figure 14:
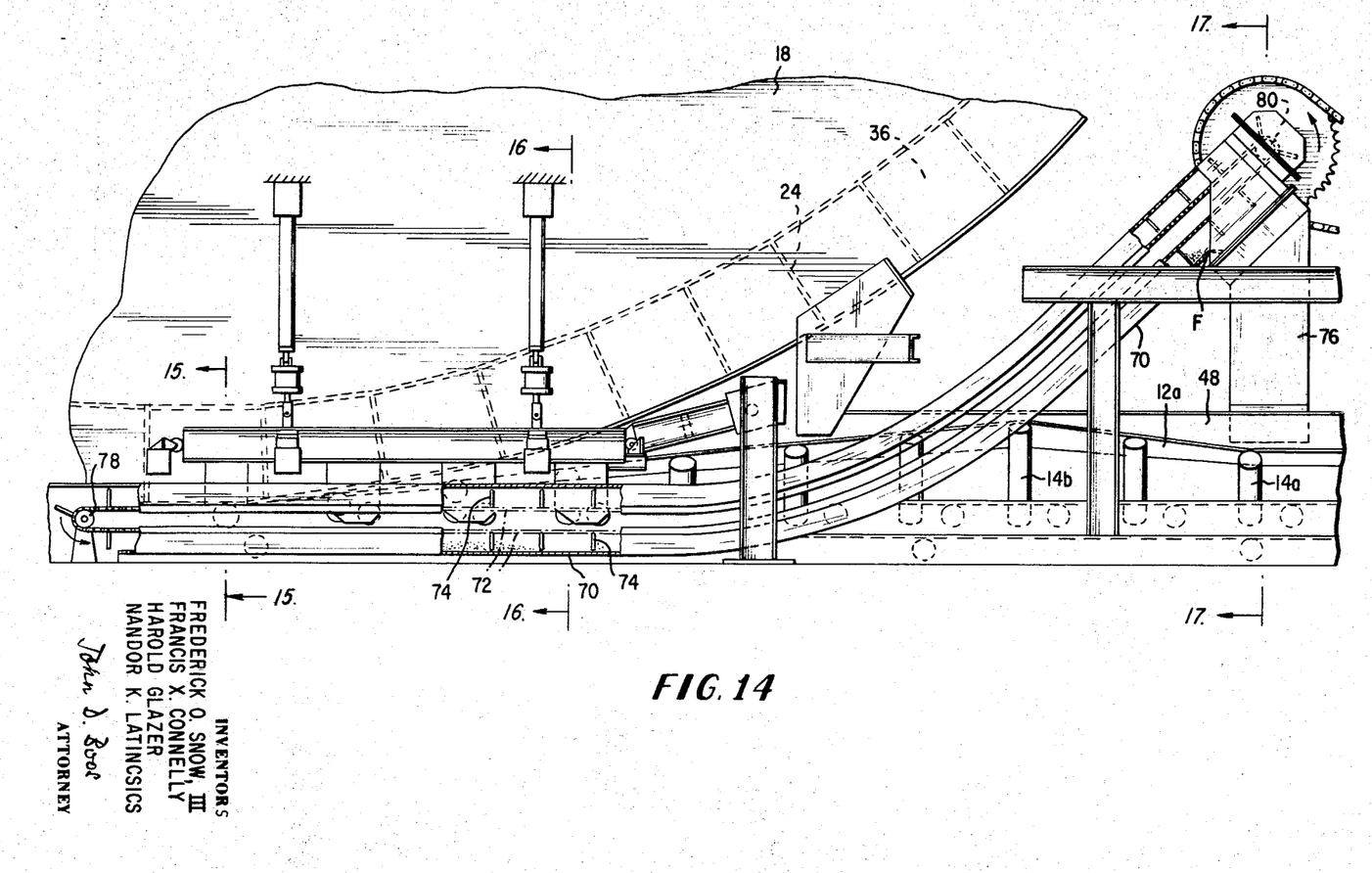
FIG. 14 is an enlarged partial view of the base portion of the elevating wheel and side return conveyor with parts broken away.
Figures 15, 17, 18:
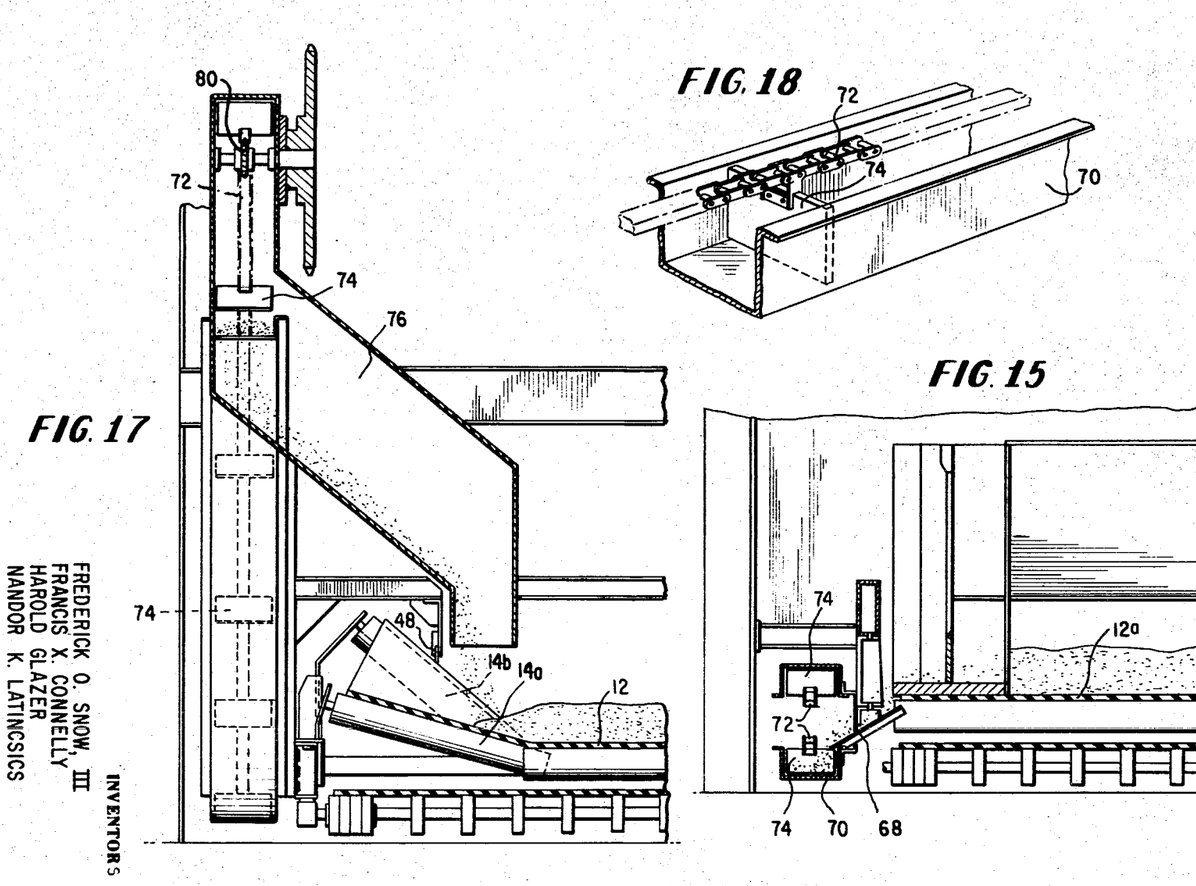
FIG. 15 is a view taken along line 15—15 of FIG. 14.
FIG. 17 is a view taken along line 17—17 OF FIG. 14.
FIG. 18 is an enlarged partial view of the side return conveyor of FIG. 14.
Figure 19:
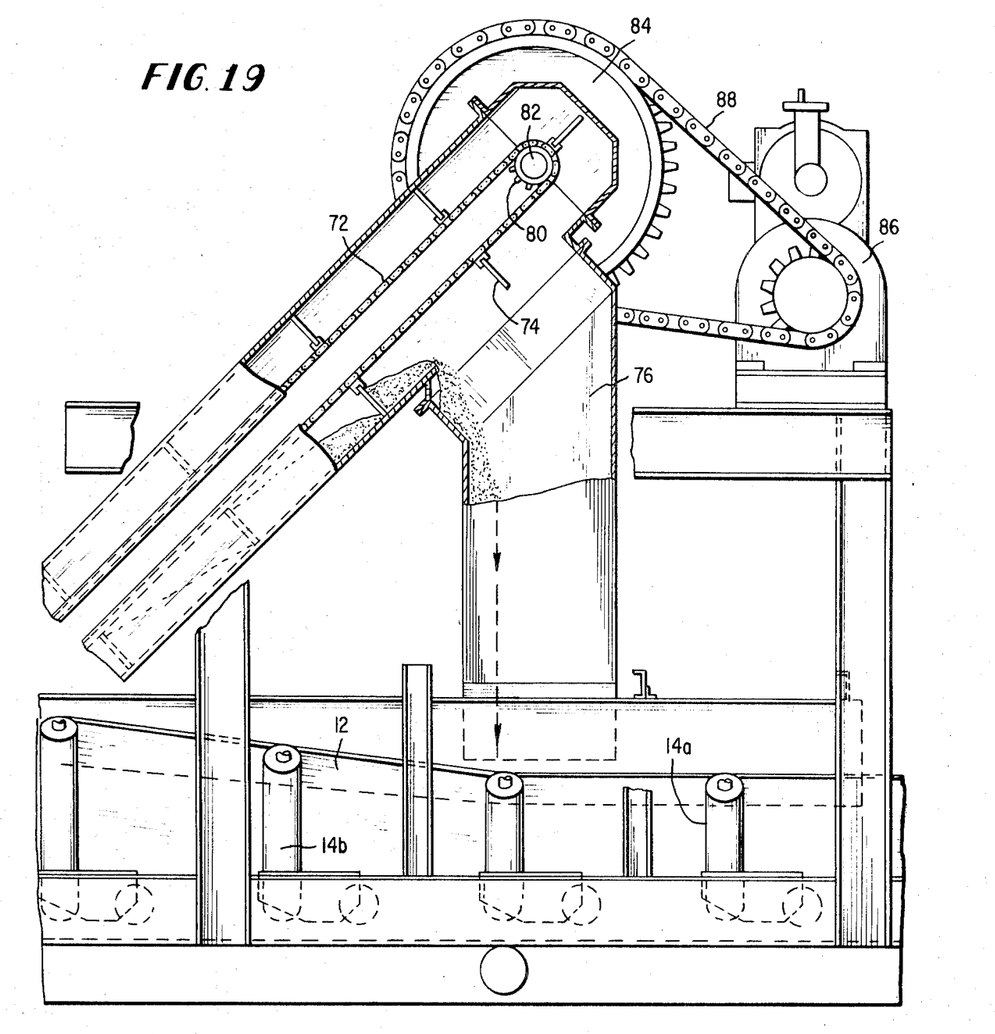
FIG. 19 is an enlarged fragmentary view of the drive mechanism for the side return conveyors.

Due to the relatively high speed motion of conveying reach 12a and further due to the insertion of the bulk materials into the storage cells 36, some of the materials, as well as dust created by the conveyed materials, may escape from the skirt board 52 and will fall to the sides of the conveying reach 12a. Since this type of conveying system is generally used in a relatively confined, difficult to get at space, such, for example, as in the bottom of a self-unloading vessel, spillage and debris problems cannot be tolerated. Therefore, in association with the conveyor 10 and elevating wheel 18 may be provided a further modification of the present invention including a pair of conveying systems for minimizing any spillage and dust problems. Referring to FIGS. 14 through 17, a slide or shield is situated at each side of conveying reach 12a so as to provide a downwardly, outwardly inclining surface 68 which will catch any spillage or dust escaping from conveyor reach 12a. The dust, debris and spillage from the conveyor falls along incline surface 68 into a troughlike member 70 having a conveyor passing therethrough. The conveyor consists basically of a travelling chain 72 with depending outwardly extending paddles, or vanes 74 fixedly attached thereto. The paddles 74 scrape along the troughlike member 70 so as to convey the material within the trough away from the elevating wheel 18 in a direction opposite to the direction of movement of conveying reach 12a, The trough 70 extends longitudinally along the base of the elevating wheel 18 at those portions most likely to create spillage and dust and then upwardly in a curvilinear manner, as shown in FIG. 14, to a position indicated generally by the reference character F at which point the trough 70 terminates into a chute 76, as shown in FIGS. 14, 17 and 19. Position F and chute 76 are associated with that portion of conveyor reach 12a prior to the transition section D and the centering of the bulk materials. In this manner, the materials conveyed by paddles 74 and deposited within chute 76 will be redeposited upon conveyor reach 12a prior to the centering action of the bulk materials on the conveyor reach. The chain 72 is composed of a plurality of links, as shown in FIG. 18, and reverses to form a return reach about a pinion-type gear 78 while being driven through a pinion gear 80. As most clearly shown in FIG. 19, pinion gear 80 is driven through a shaft 82 by an enlarged gear 84 which is, in turn, driven by a conventional motor 86 through a chain 88.

Figure 16:
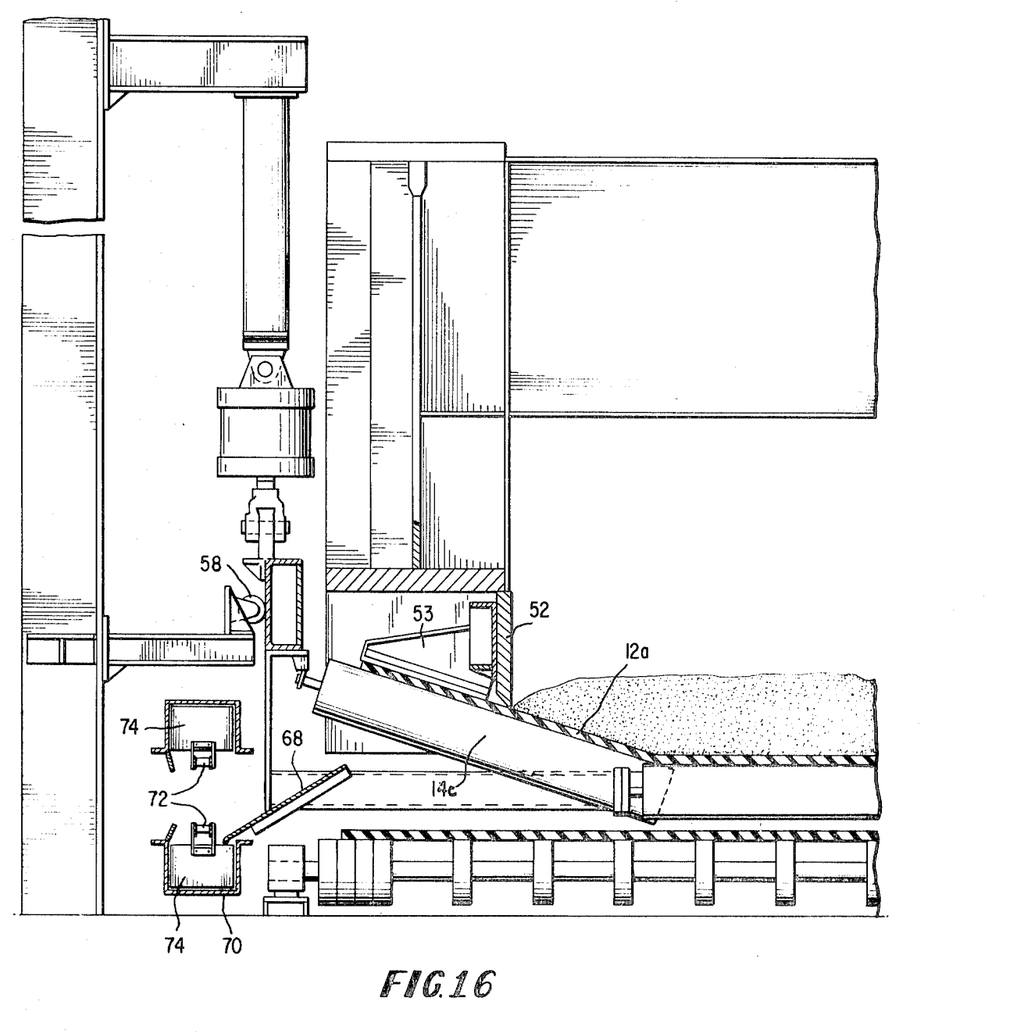
FIG. 16 is a view taken along line 16—16 of FIG. 14.

As a further modification of the present invention removal means for removing material from the outer edges of the conveying reach may be employed such, for example, as illustrated in FIG. 16 as a plow or wiper blade 53 which contacts the top surface of the belt along each edge and serves to scrape any material off the outer edges of the belt into trough 70 for the chain-driven return conveyor. In this manner, it is possible to insure that there are no fines or other material on the belt which would inhibit the belt from making sealing contact with the outer rims of the wheel. As a further modification of the present invention the removal means may include air jets blowing the material off the outer edge portions of the belt for deposit into troughs 70.

In operation, the conveyor belt is driven by powered head pulley 44 and the conveyor belt, in turn, frictionally drives the elevating wheel 18 in a clockwise direction, as viewed in FIG. 1. The conveying reach of the conveyor belt is gradually elevated at the sides thereof so as to center the bulk materials transported thereby and subsequently is gradually flattened from its troughed position as it approaches the rotating elevating wheel and the flat elevating section that wraps around the peripheral section of the wheel. The material on the conveying reach is guided by the fixed and pivoted side boards into the storage cells of the rotating elevating wheel at a loading station at the bottom of the wheel, and the material trapped in the storage cells is then elevated to a discharge or unloading station located over conveyor 20. To further assist in assuring that the material on the conveying reach will be deposited within the storage cells 34, the idler rollers adjacent the base portion of the elevating wheel are resiliently mounted so as to assure good sealing contact with the wheel in the event that there are any irregularities in the round configuration of the outer peripheral portion. Conveyors and associated inclined surfaces are provided at the sides of the conveying reach so as to capture dust and spillage from the conveying reach and redeposit the materials so captured on the conveying reach prior to the centering action of the elevated side idler rollers.

It will be recognized that the elevating section of the conveying reach and the backing plate or seal belt combine with the storage cells in order to prevent material in the cells from being discharged through the openings as the cells move from the loading station to the unloading station. The elevating section of the conveying reach serves as a cover which prevents material from being discharged through the loading opening. It is therefore necessary that the elevating section remain in contact with the wheel, at least until the material in the storage cells has been transferred from the belt, or, in other words, until the conveyed material has shifted away from the loading openings, as shown in FIG. 1. The backing plate 38 or equivalent seal belt covers the interior openings of the storage cells as the cells are elevated between points A and B, and prevents the shifting material from otherwise being discharged through the unloading openings. Thus, the backing plate or seal belt covers the unloading openings of the storage cells as the cells move through that portion of the path between the loading station and the discharge station where the trapped material would normally be discharged through the unloading openings.

The above-described elevating means can be employed at almost any location where material on belt conveyors must be elevated a relatively large height within a relatively short distance. For example, this invention can be employed with a discharge conveyor located at the bottom of a self-unloading vessel. In this case, the conveying reach extends beneath the storage holds and a means is employed for loading material from the storage holds onto the conveying reach. In one particular type of self-unloading vessel, the head end of the discharge conveyor and the elevating wheel is located at the stern of the vessel and the elevating wheel elevates the material to a shuttle conveyor in an arrangement similar to that shown in the drawings. Obviously, spillage and dust problems within a confined area such as that encountered in a self-unloading vessel cannot be readily tolerated. It can therefore be seen that the centering operation for the bulk materials on the conveying reach provides a substantial improvement in the elimination or reduction of spillage problems. Furthermore, the additional use of return conveyors at the sides of the base of the elevating wheel provide further assurance that spillage and dust will not present a substantial problem in that materials falling from the belt at the wheel loading or transition area or leaving the belt in the form of dust will be returned to the conveying reach to again approach the elevating wheel with the remainder of the bulk materials.

It will be apparent that the elevating wheel of the present invention provides means for use in combination with a conventional belt conveyor which will permit conveyed material to be elevated relatively large heights within relatively short distances. By trapping the conveyed material in the storage cells, it is possible to overcome the elevating problem caused by the relatively free-flowing character of many types of bulk materials. The elevating wheel is especially designed so that side boards can guide conveyed material directly into the loading openings of the storage cells with the material centrally located on the belt. The friction drive of the elevating wheel by the conveyor belt obviates the problem of synchronizing the speed of the wheel with the speed of the belt. Also, the specific elevating wheel design is relatively simple with the storage cells open at either end, and with the wheel not having any center spoke structure.

Obviously, many modifications and variations of the present invention are possible in light of the above teachings. For example, the backing plate can be eliminated if the storage cells were shaped and the unloading openings were positioned in such a manner that the storage cells would retain the stored material until the cells reached the stored station. It is therefore to be understood that within the scope of the appended claims, the invention may be practiced otherwise than has been specifically described.

What is claimed as new and desired to be secured by Letter Patent of the United States is:

1. An elevating wheel in combination with a conveyor having a conveyor belt moving through a conveying reach and return reach, said conveying reach including a conveying section, an elevating section, and a transition section which is intermediate said conveying section and said elevating section, said elevating wheel being formed with storage cells around a periphery of said wheel, each of said cells being formed with a loading opening and an unloading opening, said elevating wheel being rotatably mounted and having a drive means for rotating said wheel when said conveyor is in operation, said elevating section being wrapped around a peripheral section of said wheel so that the bulk material on the elevating section of said belt can be transferred through said loading openings into said storage cells, troughing idlers supporting said conveyor belt throughout a substantial length of the conveying section of said conveying reach in a troughlike configuration with the side portions of said belt being upwardly inclined with the longitudinal edges of said belt positioned at a first elevation, the improvement in said transition section comprising a first means in said transition section adjacent said conveying section which supports the conveyor belt in a troughlike configuration with the longitudinal edges thereof positioned at a second elevation which is higher than said first elevation so as to enable bulk material carried by said conveyor belt to be centered thereon, the location of said longitudinal edges at said second elevation being between said conveying section where said edges are at said first elevation and said elevating wheel, second means in said transition section for maintaining and guiding the bulk material being carried by said belt in the central portion thereof so that substantially all of the bulk material may be loaded into the storage cells of said elevating wheel.

2. The combination as set forth in claim 1, wherein said first means includes at least one troughing idler having an angle of inclination of the side portions thereof greater than the angle of inclination of the side portions of said troughing idlers supporting said conveyor belt throughout said substantial length of said conveying section.

3. The combination as set forth in claim 1, further including third means in said transition section for lowering said conveyor belt to a substantially flat condition.

4. The combination as set forth in claim 2, wherein said means for maintaining and guiding said bulk materials includes at least one pair of skirt boards above said conveyor and having the lower edge portions thereof in surface contact with the load supporting surface of said belt conveyor.

5. The combination as set forth in claim 4, wherein said pair of skirt boards are located adjacent said elevating wheel for guiding material on said conveying reach into said loading openings in said wheel.

6. The combination as set forth in claim 5, wherein the upper edge portions of said pair of skirt boards conform in configuration with the peripheral portion of said elevating wheel.

7. The combination as set forth in claim 6, further including a second pair of skirt boards in longitudinal alignment with said first pair of skirt boards and extending from the position on said conveying reach raised to said second elevation to a position adjacent said first pair of skirt boards.

8. The combination as set forth in claim 7, wherein at least one pair of said skirt boards is pivotally mounted so as to remain in surface contact with the load-supporting surface of said belt conveyor.

9. The combination as set forth in claim 4, wherein said conveying reach is supported by a plurality of idler rollers, at least a portion of said idler rollers being spring biased toward said elevating wheel so as to resiliently support said conveyor reach adjacent the storage cells being loaded.

10. The combination as set forth in claim 4, which is further characterized by conveying means for receiving spillage and dust adjacent the side portions of said conveying reach and said elevating wheel and for depositing said spillage and dust upon the load-supporting surface of said belt conveyor.

11. The combination as set forth in claim 10, which is further characterized by removal means for removing material from the outer edges of said conveying reach.

12. The combination as set forth in claim 10, wherein said conveying means includes troughlike members extending along the side portions of said conveying reach, each of said troughlike members having a portion thereof extending upwardly above said conveying reach, a conveyor within each of said troughlike members having a direction of travel opposite to the direction of travel of said belt conveyor reach.